US010684408B2

(12) United States Patent
Wang et al.

(10) Patent No.: US 10,684,408 B2
(45) Date of Patent: Jun. 16, 2020

(54) DISPLAY DEVICE AND IMAGE DISPLAY METHOD

(71) Applicant: BOE TECHNOLOGY GROUP CO., LTD., Beijing (CN)

(72) Inventors: Wei Wang, Beijing (CN); Yafeng Yang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 45 days.

(21) Appl. No.: 15/748,050

(22) PCT Filed: Jul. 27, 2017

(86) PCT No.: PCT/CN2017/094656
§ 371 (c)(1),
(2) Date: Jan. 26, 2018

(87) PCT Pub. No.: WO2018/072514
PCT Pub. Date: Apr. 26, 2018

(65) Prior Publication Data
US 2018/0252933 A1 Sep. 6, 2018

(30) Foreign Application Priority Data

Oct. 21, 2016 (CN) .......................... 2016 1 0921417

(51) Int. Cl.
*F21V 8/00* (2006.01)
*H04N 13/305* (2018.01)
(Continued)

(52) U.S. Cl.
CPC ........... *G02B 6/0068* (2013.01); *G02B 6/005* (2013.01); *G02B 27/4205* (2013.01);
(Continued)

(58) Field of Classification Search
CPC .. G02B 27/2264; G02B 6/005; G02B 6/0068; G02B 27/225; G02B 27/4205; G02F 1/313
See application file for complete search history.

(56) References Cited

U.S. PATENT DOCUMENTS

2005/0264717 A1 12/2005 Chien et al.
2012/0019908 A1 1/2012 Choi et al.
(Continued)

FOREIGN PATENT DOCUMENTS

CN 103984110 A 8/2014
CN 104007552 A 8/2014
(Continued)

OTHER PUBLICATIONS

Second Chinese Office Action dated Dec. 26, 2018.
International Search Report dated Oct. 25, 2017.
First Office Action dated Apr. 20, 2018.

*Primary Examiner* — Darryl J Collins
*Assistant Examiner* — Journey F Sumlar
(74) *Attorney, Agent, or Firm* — Dilworth & Barrese, LLP.; Michael J. Musella, Esq.

(57) ABSTRACT

A display device is provided, and the display device includes a backlight module, a display module and a light directing component which are sequentially arranged. The backlight module is configured to periodically and sequentially emit collimated light in S different directions; the collimated light in different directions runs through the display module and arrives at the light directing component, in which S≥2; and the light directing component is configured to converge incident collimated light in a same direction to a same preset viewpoint and converge incident collimated light in different directions to different preset viewpoints, in which the preset viewpoints at least include two preset viewpoints belonging (Continued)

to a same eyeball. An image display method applied to the display device is also provided.

18 Claims, 9 Drawing Sheets

(51) Int. Cl.
*G02B 27/42* (2006.01)
*G02B 30/34* (2020.01)
*G02B 30/26* (2020.01)
*H04N 13/32* (2018.01)

(52) U.S. Cl.
CPC ............ *G02B 30/26* (2020.01); *G02B 30/34* (2020.01); *H04N 13/305* (2018.05); *G02B 6/0076* (2013.01); *H04N 13/32* (2018.05)

(56) References Cited

U.S. PATENT DOCUMENTS

| | | |
|---|---|---|
| 2015/0260999 A1 | 9/2015 | Wang et al. |
| 2015/0370073 A1* | 12/2015 | Martinez ................. G02B 5/18 |
| | | 359/630 |
| 2016/0231579 A1 | 8/2016 | Borovkov |
| 2017/0090269 A1* | 3/2017 | Huang .................... G02F 1/292 |
| 2017/0310654 A1 | 10/2017 | Karlisch et al. |
| 2017/0363794 A1 | 12/2017 | Wan et al. |

FOREIGN PATENT DOCUMENTS

| | | |
|---|---|---|
| CN | 104460115 A | 3/2015 |
| CN | 105572884 A | 5/2016 |
| CN | 105866963 A | 8/2016 |
| CN | 105954883 A | 9/2016 |
| CN | 106291958 A | 1/2017 |
| WO | 2015018941 A1 | 2/2015 |

* cited by examiner

DISPLAY DEVICE AND IMAGE DISPLAY METHOD

The application claims priority to the Chinese patent application No. 201610921417.0, filed Oct. 21, 2016, the disclosure of which is incorporated herein by reference as part of the application.

TECHNICAL FIELD

The present disclosure relates to a display device and an image display method.

BACKGROUND

With the advance of technology, image display is no longer confined to the screen plane of two-dimensional (2D) space, and the image display of three-dimensional space (3D) is more and more applied in people's daily work, study, entertainment, etc.

SUMMARY

At least one embodiment of the disclosure provides a display device, comprising a backlight module, a display module and a light directing component which are sequentially arranged, wherein the backlight module is configured to periodically and sequentially emit collimated light in S different directions; the collimated light in different directions runs through the display module and arrives at the light directing component, in which S≥2; and the light directing component is configured to converge incident collimated light in a same direction to a same preset viewpoint and converge incident collimated light in different directions to different preset viewpoints, in which the preset viewpoints at least include two preset viewpoints belonging to a same eyeball.

In some examples, the preset viewpoints include a plurality of preset viewpoints belonging to different eyeballs; the preset viewpoints belonging to the same eyeball form one viewpoint group; and the preset viewpoints belonging to different eyeballs form different viewpoint groups.

In some examples, each viewpoint group includes at least two preset viewpoints.

In some examples, a maximum angle between the collimated light in different directions corresponding to different viewpoints belonging to the same eyeball is less than or equal to 1°.

In some examples, the backlight module includes a grating waveguide coupling structure; the grating waveguide coupling structure includes a waveguide layer, a grating structure disposed on an upper surface of the waveguide layer, an upper dielectric layer disposed above the waveguide layer, and a lower dielectric layer disposed beneath the waveguide layer; the upper dielectric layer and the lower dielectric layer have a refractive index less than that of the waveguide layer; the backlight module further includes at least one collimated light source disposed on a side surface of the waveguide layer; and the at least one collimated light source as a whole is configured to emit collimated light in at least two different directions.

In some examples, the backlight module includes a plurality of collimated light sources each of which has a single light-emitting direction; and at least two collimated light sources in the plurality of collimated light sources have different light-emitting directions.

In some examples, the waveguide layer has a planar shape of rectangular; and the collimated light sources with single light-emitting directions in the backlight module are distributed on two opposite side surfaces of at least one group of the waveguide layer.

In some examples, the collimated light sources have at least two light-emitting directions.

In some examples, the waveguide layer has a planar shape of rectangular; and the collimated light sources with at least two light-emitting directions in the backlight module are distributed on one side surface of the waveguide layer.

In some examples, the upper dielectric layer is optical adhesive and the lower dielectric layer is transparent organic material.

In some examples, the display module includes a first subpixel unit, a second subpixel unit and a third subpixel unit; the backlight module includes a first grating waveguide coupling structure, a second grating waveguide coupling structure and a third grating waveguide coupling structure; a grating structure of the first grating waveguide coupling structure is arranged opposite to the first subpixel unit; a grating structure of the second grating waveguide coupling structure is arranged opposite to the second subpixel unit; a grating structure of the third grating waveguide coupling structure is arranged opposite to the third subpixel unit; and the collimated light source disposed on a side surface of the first grating waveguide coupling structure, the collimated light source disposed on a side surface of the second grating waveguide coupling structure, and the collimated light source disposed on a side surface of the third grating waveguide coupling structure are configured to emit light of different primary colors.

In some examples, the lower dielectric layer has a thickness of 10 μm-100 μm.

In some examples, the backlight module is a direct-lit backlight module; and the direct-lit backlight module is configured to emit collimated light in at least two light-emitting directions.

In some examples, the light directing component is a lens, a microlens array or a transmission grating.

At least one embodiment of the disclosure provides an image display method applied to the display device as mentioned above, comprising: controlling the backlight module to periodically and sequentially emit collimated light in S different directions; and upon the backlight module emitting the collimated light in any one of the different directions, inputting one frame of rendering image, corresponding to a preset viewpoint to which the collimated light in the direction is converged, into a display module, so that the optical field three dimensional (3D) display device displays the frame of rendering image.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1A:
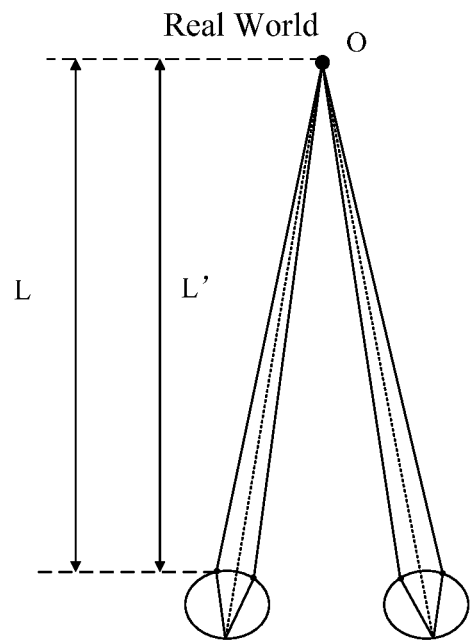
FIG. 1A is a schematic diagram illustrating optical paths of image viewing via human eyes in a real world.
Figure 1B:
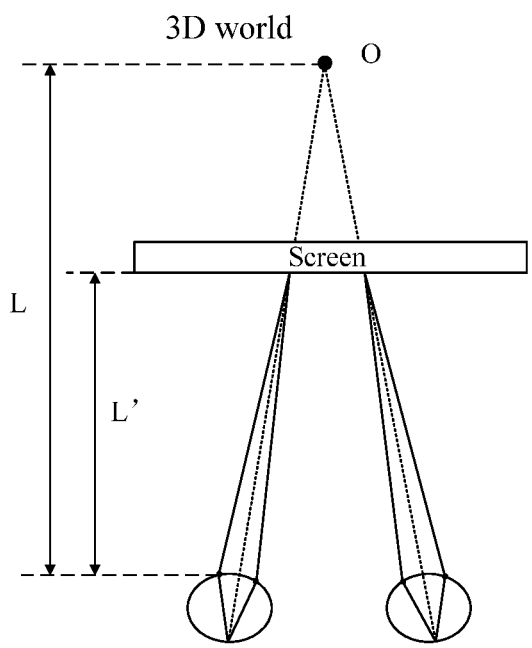
FIG. 1B is a schematic diagram illustrating optical paths of image viewing via human eyes in a 3D world.

In a real world, as illustrated in FIG. 1A, when an object O is viewed by normal human eyes, the binocular vision convergence distance L is equal to the monocular focal distance L', namely focusing positions are disposed on the viewed object O. However, in a parallax 3D world, as illustrated in FIG. 1B, as the screen only provides a binocular parallax image of a viewed optical field and does not provide corresponding light direction information required by monocular focusing, the focusing position of one eye is always disposed on the screen, and two eyes are converged to a virtual object on the outside of the screen due to parallax. That is to say, in the parallax 3D world, the binocular vision convergence distance L is unequal to the monocular focal distance L', so the human eyes will feel dizzy and uncomfortable when viewing 3D images.

Figure 2:
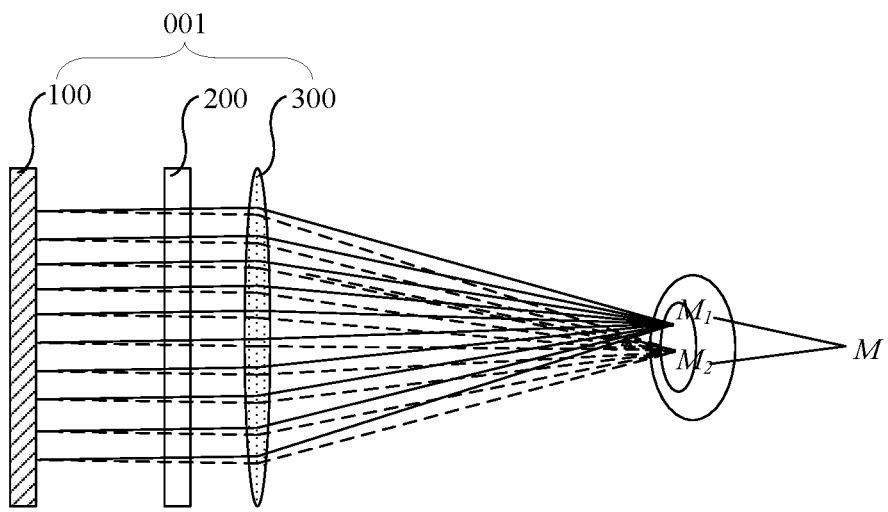
FIG. 2 is a schematic diagram illustrating optical paths of an optical field 3D display device provided by the embodiment of the present disclosure.

The embodiment of the present disclosure provides a display device. As illustrated in FIG. 2, the display device 001 comprises a backlight module 100, a display module 200 and a light directing component 300 which are sequentially arranged.

The backlight module 100 is configured to periodically and sequentially emit collimated light in S different directions, and S≥2 (description is given in FIG. 2 by only taking S=2 as an example). The collimated light in different directions runs through the display module 200 and arrives at the light directing component 300.

The light directing component 300 is configured to converge incident collimated light in the same direction to the same preset viewpoint $M_i$ (1≤i≤S) and converge incident collimated light in different directions to different preset viewpoints, in which the preset viewpoints belonging to the same eyeball in the S preset viewpoints form one viewpoint group M; the viewpoint group M includes at least two preset viewpoints; and different viewpoint groups M are disposed in different eyeballs. In general, the distance from the preset viewpoint $M_i$ (namely the human eye) to the optical field 3D display device 001 may be 1-30 cm. In actual application, for example, the preset viewpoint $M_i$ is disposed at a position which is 2 cm-5 cm away from the display device 001.

It should be understood by those skilled in the art that the description that the preset viewpoints belonging to the same eyeball in the S preset viewpoints form one viewpoint group M refers to that the preset viewpoints at the pupil position of the same eyeball in the S preset viewpoints form one viewpoint group M, so as to realize 3D focus effect. For example, one viewpoint group M at least includes two preset viewpoints.

The incident collimated light in S different directions runs through the display module and the light directing component and is converged to S different preset viewpoints. Moreover, the preset viewpoints belonging to the same eyeball in the S preset viewpoints form one viewpoint group, and different viewpoint groups are disposed in different eyeballs. Thus, when the display module displays S rendering images for S different preset viewpoints, at least two preset viewpoints in the viewpoint group disposed in one eyeball may at least acquire two rendering images, so one eyeball can obtain rendering images with 3D effect. Moreover, when the display module displays appropriate S rendering images, the focal distance of a single eyeball on the rendering images acquired by the viewpoint group in the eyeball can be consistent with the vision convergence distance when two eyeballs acquire the rendering images with 3D effect respectively through the viewpoint groups in corresponding eyeballs. Thus, the dizzy problem in the parallax 3D technology can be solved, namely the optical field 3D display device can provide hardware support for consistent monocular focal distance and binocular vision convergence distance.

For example, the plurality of preset viewpoints include a plurality of preset viewpoints belonging to different eyeballs; the preset viewpoints belonging to the same eyeball form one viewpoint group; and the preset viewpoints belonging to different eyeballs form different viewpoint groups.

It should be understood by those skilled in the art that: when the number of the viewpoint groups M is two, if the two viewpoint groups M respectively correspond to viewpoint groups M of a person's two eyeballs, the relative position of the two viewpoint groups M shall comply with the relative position of two eyes of most people; and if the two viewpoint groups M are viewpoint groups M of eyeballs of different people, the relative position of the two viewpoint groups M is not limited. In addition, the rendering images obtained by the method may be applied to virtual reality (VR) display and may also be applied to augmented reality (AR) display. No limitation will be given here in the present disclosure.

It should be noted here that the display device not only can realize monocular optical field 3D display but also can realize binocular optical field 3D display. As for monocular optical field 3D display, at least two frames of preset rendering image may be directly and periodically displayed on the entire display module 200, and the light directing component is adopted to converge the at least two frames of preset rendering image to the pupil of one eye, so as to achieve the objective of acquiring images with 3D effect via one eye.

As for binocular optical field 3D display, a plurality of frames of preset rendering image may be directly and periodically displayed on the entire display module 200, and the light directing component is adopted to converge at least two frames of preset rendering image to the pupil of the left eye and converge at least two frames of preset rendering image to the pupil of the right eye, so as to acquire images with 3D effect via two eyes. Of course, the preset rendering images corresponding to the left eye and the right eye may also be displayed in different regions of the display module 200, and the light directing component is adopted to converge the rendering images corresponding to the left eye and the right eye to the left eye and the right eye, so as to realize 3D display. For example, the display module 200 may be divided into a left display region and a right display region, in which the left display region correspondingly displays at least two frames of preset rendering image of the left eye, and the light directing component is adopted to converge the at least two frames of preset rendering image to the pupil of the left eye; and the right display region correspondingly displays at least two frames of preset rendering image of the right eye, and the light directing component is adopted to converge the at least two frames of preset rendering image to the pupil of the right eye, so as to obtain images with 3D effect via two eyes.

It should be also noted here that: the arrangement mode of the plurality of preset viewpoints $M_i$ in one viewpoint group M is not limited, as long as the plurality of preset viewpoints $M_i$ are guaranteed to be disposed on the same eyeball, namely the maximum distance between adjacent viewpoints shall be less than or equal to 2.5 mm. For example, when the viewpoint group M includes two preset viewpoints, the two preset viewpoints may be distributed side by side. Moreover, for example, when the viewpoint group M includes three preset viewpoints, the three preset viewpoints may be distributed in a triangular shape. Furthermore, when the viewpoint group M includes four preset viewpoints, the four preset viewpoints may be distributed in a quadrilateral shape.

On this basis, if the angle between the collimated light in different directions corresponding to one viewpoint group M is greater than 1°, the plurality of preset viewpoints $M_i$ in the viewpoint group M will not fall into the pupil of one eyeball. Thus, in the embodiment of the present disclosure, the maximum angle between the collimated light in different directions corresponding to one viewpoint group M is less than or equal to 1°, so as to ensure that the plurality of preset viewpoints $M_i$ in the viewpoint group M can be disposed on the pupil of one eyeball. Of course, the angle between the collimated light in different directions here is set for unmoved eyeball. In actual application, the eyeball will move within specific range. Thus, the maximum angle between the collimated light in different directions can be appropriately increased, but the maximum angle between the collimated light in different directions corresponding to the viewpoint group M falling into a single pupil shall still be less than or equal to 1°, so as to realize 3D focus effect.

Further description will be given below to the specific arrangement of the light directing component 300.

Figure 3A:
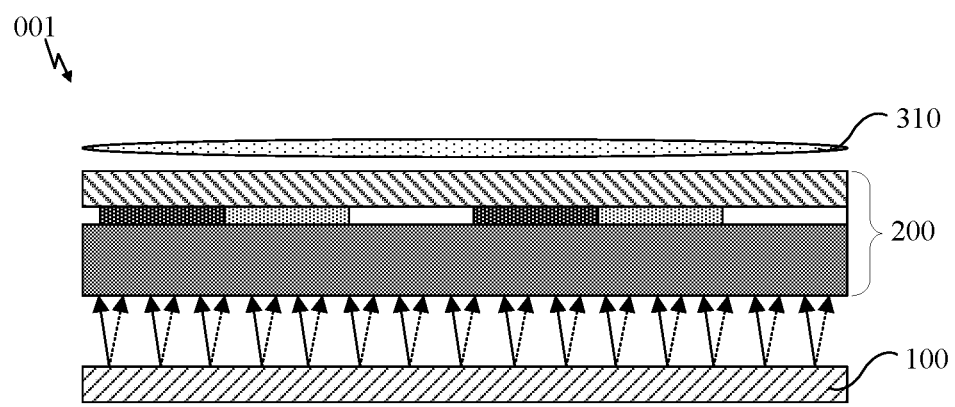
FIG. 3A is a schematic structural view of the optical field 3D display device provided by the embodiment of the present disclosure.

For example, as illustrated in FIG. 3A, the light directing component 300 may be a lens 310, e.g., a liquid crystal lens, or other lens with adjustable focal length, which covers the entire display module. No limitation will be given here in the present disclosure.

Figure 3B:
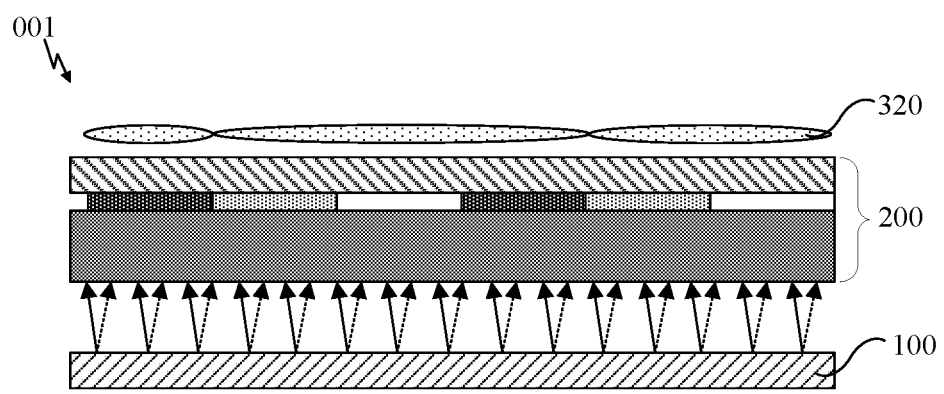
FIG. 3B is a schematic structural view of another optical field 3D display device provided by the embodiment of the present disclosure.

Moreover, for example, as illustrated in FIG. 3B, the light directing component 300 may be a microlens array 320 which covers the entire display module, in which a single lens in the microlens array 320 may correspond to one subpixel unit and may also correspond to two or more than two subpixel units, as long as the collimated light in the same direction, being emitted from the backlight module 100 and running through the display module 300, can be guaranteed to be converged to the same preset viewpoint $M_i$. No limitation will be given here in the present disclosure.

In addition, the microlens array 320 may be made from glass materials or transparent resin materials and, of course, may also be formed by an optical film. As the optical film is light and thin, in the assembly process of the optical field 3D display device, the whole layer may be directly bonded by the optical film, so the phenomenon of inaccurate alignment will not occur. Therefore, the microlens array 320 adopting the optical film can reduce the assembly error, simplify the manufacturing process, and is in line with the lightweight design concept of the optical field 3D display device.

Figure 3C:
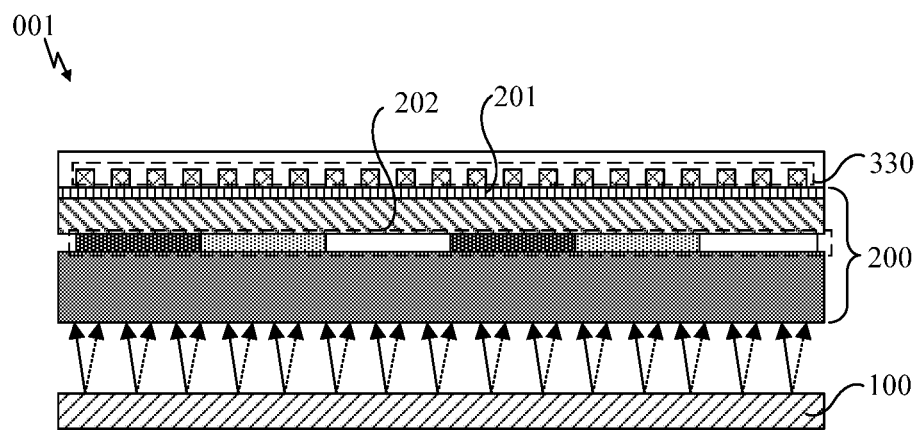
FIG. 3C is a schematic structural view of another optical field 3D display device provided by the embodiment of the present disclosure.

Moreover, for example, as illustrated in FIG. 3C, the light directing component 300 may be a transmission grating 330. The transmission grating 330 may be integrated into the display module 200 and may also be an independently manufactured film layer. As the independent transmission grating film layer is light and thin, the phenomenon of inaccurate alignment will not occur. Thus, the light directing component can reduce the assembly error, simplify the manufacturing process, and is in line with the lightweight design concept of the optical field 3D display device.

It should be noted that the light directing component 300 may be disposed on the inside of the display module 200 and may also be disposed on a light-emitting side, namely the outside, of the display module 200, as illustrated by the lens 310 in FIG. 3A, the microlens array 320 in FIG. 3B and the transmission grating 330 in FIG. 3C. Of course, in order to not affect the internal structure of the display module 200, for example, the light directing component 300 is disposed on the light-emitting side of the display module 200.

In addition, it should be understood by those skilled in the art that the display device employing the backlight module 100 may generally be a liquid crystal display (LCD). As for an LCD, a polarizer 201 is usually arranged, and only polarized light in parallel to a transmission axis of the polarizer can run through the polarizer 201, so as to control the brightness of emergent light running through the polarizer 201 by adjustment of the voltage on both sides of liquid crystal molecules, and then achieve display in different grayscales. As the light directing component 300, e.g., the transmission grating 330, allows the polarization direction of light running through the transmission grating 330 to be deviated to a certain degree, in some embodiments of the present disclosure, when both the polarizer and the light directing component 300 are disposed on the outside of the display module 200, the light directing component 300 is disposed on one side of the polarizer 201 away from the display module 200; or the polarizer 201 is disposed on the inside of the display module 200 and the light directing component 300 is disposed on the outside of the display module 200. Thus, the light can be incident into the light directing component 300 after running through the polarizer 201, so as to avoid the case that the light runs through the light directing component 300 at first and then runs through the polarizer 201 after the deviation of the polarization direction. Therefore, the accuracy in adjusting the grayscale of the optical field 3D display device can be guaranteed.

Moreover, it should be also noted by those skilled in the art that: as illustrated in FIG. 3C, the display module 200 generally includes a color filter (CF) layer 202 and thin-film transistors (TFTs) (not illustrated in the figure) arranged corresponding to the CF layer 202. In the display module 200, the CF layer 202 may be close to one side of the light directing component 300 or the TFT layer may be close to one side of the light directing component 300. No limitation will be given here in the present disclosure. However, as the light directing component 300 must be accurately aligned with corresponding subpixel units of different colors in the CF layer 202 during arrangement, in some embodiments of the present disclosure, the CF layer 202 is close to one side of the light directing component 300, so that the distance between the CF layer 202 and the light directing component 300 can be close, and hence the alignment accuracy of the light directing component 300 and the CF layer 202 can be improved.

Further description will be given below to the principle and the arrangement mode of the transmission grating 330.

Figure 4:
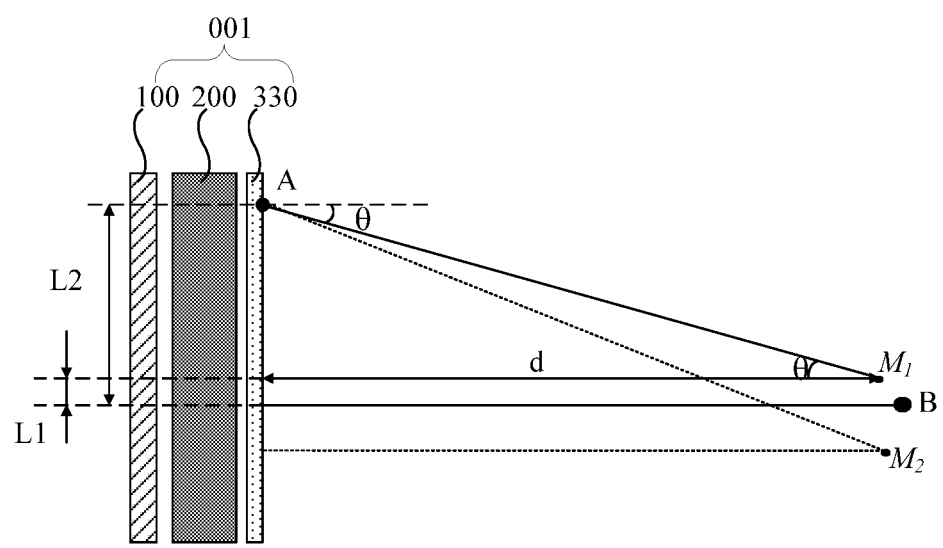
FIG. 4 is a schematic diagram illustrating optical paths of the optical field 3D display device provided by the embodiment of the present disclosure.

As illustrated in FIG. 4, taking light at any position, e.g., an A point, of the transmission grating 330 as an example, the distance between the preset viewpoint $M_i$ and the transmission grating 330 is d; the distance between the preset viewpoint $M_i$ and the pupil center B is L1; the distance from the A point to a perpendicular line of the transmission grating 330 passing through the pupil center B is L2; as illustrated in FIG. 4, when the preset viewpoint $M_1$ and the A point are on the same side of the pupil center B of the human eye, the diffraction angle of the transmission grating 330 is $\theta = \arctan[(L2-L1)/d]$; and as illustrated in FIG. 4, when the preset viewpoint $M_2$ and the A point are on two sides of the pupil center B of the human eye, the diffraction angle of the transmission grating 330 is $\theta = \arctan[(L2+L1)/d]$.

On this basis, the diffraction angle $\theta$ of the transmission grating 330 satisfies the following formula:

$$\sin \theta = \sin \theta_0 + m\lambda/P$$

In the formula, $\theta_0$ refers to incident angle; $\lambda$ refers to wavelength of incident wave; and P refers to grating period.

As the incident angle $\theta_0$ is provided by the backlight module 100, the wavelength of the incident wave $\lambda$ is a known value, so the m-order diffraction angle $\theta$ of the transmission grating 330 is only determined by the grating period P, in which m=0, ±1, ±2 . . . . Thus, the m-order diffraction angle $\theta$ of the transmission grating 330 may be set by adjustment of the grating period P according to actual demands.

Figure 5:
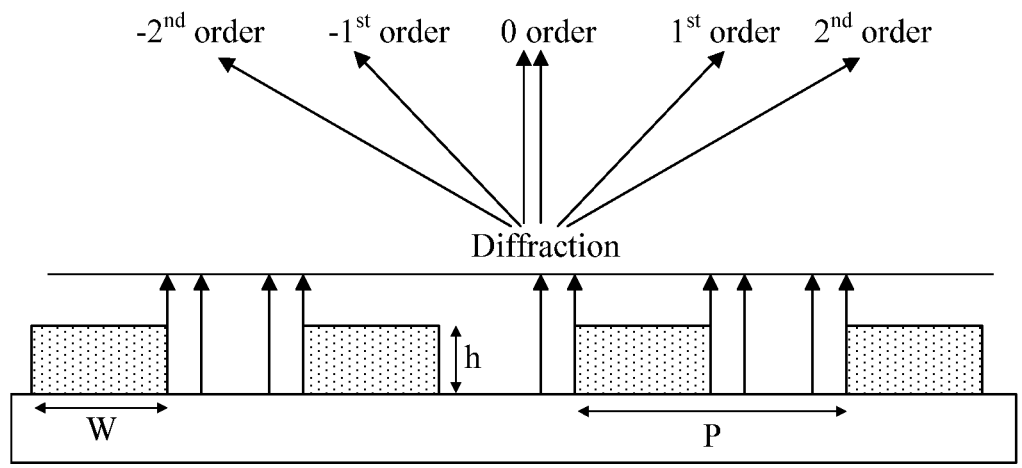
FIG. 5 is a schematic diagram illustrating optical paths of a transmission grating in the embodiment of the present disclosure.

In addition, as illustrated in FIG. 5, further description is given to the m-order diffraction angle $\theta$. As for the m-order diffraction angle $\theta$, as the direction of zero order diffraction is the same with the direction of incident light, the diffraction direction of first order diffraction or more may be adjusted via the grating period P. Moreover, the diffraction intensity of zero order and first order diffraction is high, and the diffraction intensity of two order diffraction or more is lower than that of zero order and first order diffraction, in general, the light direction adjustment adopts first order diffraction.

On this basis, as the maximum efficiency of the grating on light is achieved when the duty ratio is 0.5, namely in FIG. 5, W/P=0.5, but the value may be deviated in actual product design and may be specifically set according to the intensity of emergent light, different brightness at different positions of a display panel, technological conditions and other factors. No limitation will be given here in the present disclosure.

In addition, after the diffraction angle $\theta$ is determined, when the phase difference of a color wave on a grid and a gap of the grating is an odd multiple of half wavelength, the zero order diffracted wave has the problem of destructive interference; the zero order wave is weakened by the mutual coherence; and the first order wave is enhanced the mutual coherence. When the phase difference is an integer multiple of the wavelength, the zero order wave is enhanced by the coherence, and the first order wave is weakened by the coherence. For the purpose of eliminating, weakening or enhancing the zero order diffracted wave in the color wave, the height of the grating may be designed for the wavelength. Of course, different color light may select different or same grating height. In the present disclosure, the height of the grating may be 100 nm-1,000 nm, e.g., may be 200 nm-500 nm.

Further description will be given below to the backlight module 100 with reference to the preferred embodiments.

It should be noted here that the orientation terms such as "on", "beneath" and "side surface" are defined herein with respect to the schematic orientation of the accompanying drawings. It should be understood that these directional terms are relative concepts, are used in relative description and clarification, and may be correspondingly changed according to the change of the placed orientation of the display module. For example, the "upper surface of the waveguide layer" refers to the light-emitting side of the waveguide layer, and the "lower surface of the waveguide layer" refers to the incident side of the waveguide layer.

First Embodiment

Figure 6:
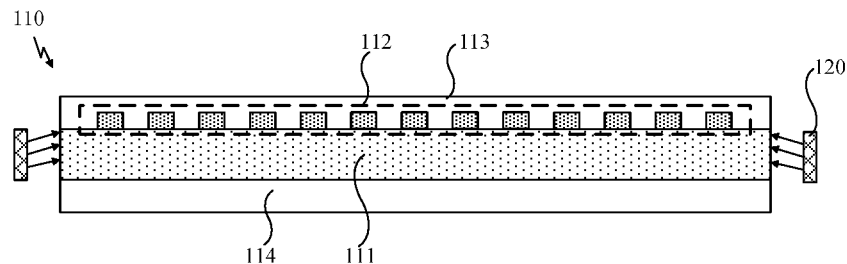
FIG. 6 is a schematic structural view of a grating waveguide coupling structure in the embodiment of the present disclosure.

As illustrated in FIG. 6, the backlight module 100 includes a grating waveguide coupling structure 110. The grating waveguide coupling structure 110 includes a waveguide layer 111, a grating structure 112 disposed on an upper surface of the waveguide layer 111, an upper dielectric layer 113 disposed above the waveguide layer 111, and a lower dielectric layer 114 disposed beneath the waveguide layer. Both the refractive index of the upper dielectric layer 113 and the refractive index of the lower dielectric layer 114 are less than that of the waveguide layer 111. For example, the refractive index of the waveguide layer 111 may be 1.7-1.8, and the refractive index of the upper dielectric layer 113 and the lower dielectric layer 114 may be 1.5, so as to achieve good optical coupling effect. The backlight module 100 further includes at least one collimating light source 120 disposed on a side surface of the waveguide layer 111. The whole formed by the collimating light sources 120 is configured to emit collimated light in at least two different directions.

It should be noted that the grating structure 112 disposed on the upper surface of the waveguide layer 111 may be a notch disposed on the upper surface of the waveguide layer 111, namely the waveguide layer 111 and the grating structure 112 are an integral structure; and the grating structure 112 and the waveguide layer 111 may also be mutually independent structures, as long as the refractive index of light of grids of the grating structure 112 and parts of gaps between the grids is guaranteed to be different. No limitation will be given here in the present disclosure.

On this basis, the thickness of the waveguide layer 111 is generally 0.1 mm-2 mm. As similar to the transmission grating 330, the duty ratio of the grating structure 112 in the waveguide layer 111 is preferably 0.5. The height of the grating may be 100 nm-1,000 nm, for example, may be 100 nm-300 nm. Different subpixel units may select same or different grating height. The height is specifically set according to actual demands. No limitation will be given here in the present disclosure.

Figure 7:
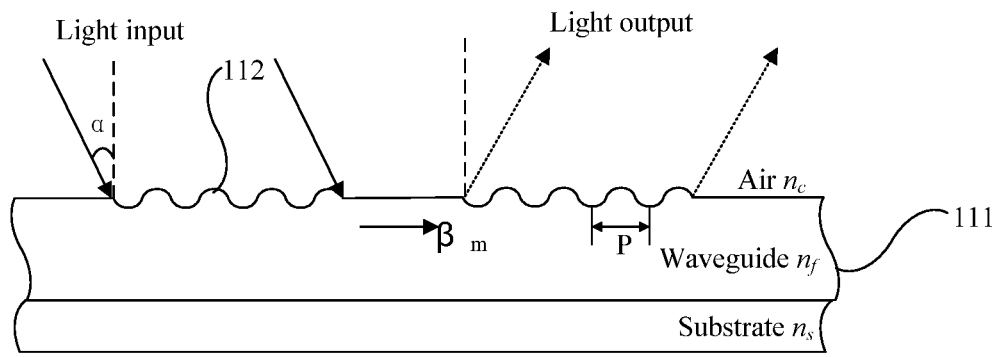
FIG. 7 is a schematic diagram illustrating the optical principle of the grating waveguide coupling structure in the embodiment of the present disclosure.

Simple description will be given below to the working principle of the grating waveguide coupling structure 110. As illustrated in FIG. 7 which is a schematic diagram of the grating waveguide coupling structure 110, the upper dielectric layer is air dielectric, with the refraction index of $n_c$; the lower dielectric layer is a transparent substrate, with the refraction index of $n_s$; and the refraction index of the waveguide layer is $n_f$ which is greater than $n_c$ and $n_s$. The grating waveguide coupling structure 110 may couple external light into the waveguide layer 111 from the outside, namely input coupling, and may also couple light out of the waveguide layer 111, namely output coupling. No matter input coupling or output coupling is adopted, the incident light beams or the emergent light beams and multi-order diffraction beams generated by the grating structure 112 have the following relationship, in which the component $\beta_m$ of the wave vector of certain order diffracted light along the waveguide mode propagation direction satisfies the following phase matching condition, namely:

$$\beta_q = \beta_m - qK \ (q=0,\pm1,\pm2\ldots)$$

In the formula, $\beta_m$ refers to propagation constant of m-order waveguide mode; $\beta_m = k_0 N_m$; $N_m$ refers to effective refractive index of m-order waveguide mode; $k_0$ is a constant; K is a grating vector; $K=2\pi/P$; and P refers to grating period. When the angle between the wave vector direction of incident light (or emergent light) and the vertical direction is set to be α, the phase matching relationship may be further represented as:

$$k_0 n_c \sin\alpha = k_0 N_m - q2\pi/P \ (q=0,\pm1,\pm2\ldots).$$

As can be seen from the above formula, the angle α between the wave vector direction of the incident light (or the emergent light) and the vertical direction is only relevant to the grating period P, namely the direction of emergent light running through the grating waveguide coupling structure 110 may be controlled by control of the grating period P.

On this basis, an upper surface of the grating waveguide coupling structure 110 may be usually bonded with other structures in the backlight module 100 to form an integral structure, in order to avoid the waveguide from contacting external dielectric and then affect the propagation of the waveguide mode, a lower surface can have good flatness and parallelism and meanwhile have the function of protecting the waveguide layer 111. In this case, in some embodiments of the present disclosure, the upper dielectric layer 113 on the waveguide layer 111 is optical adhesive, so as to achieve the objective of bonding and transmission; and the lower dielectric layer 114 beneath the waveguide layer 111 is transparent organic materials, e.g., silicon oxide or resin, and of course, may also be a metallic reflective film layer, and has good flatness and parallelism.

It should be noted that the specific setting of the dielectric layer 13 is only preferred setting. In actual application, the upper dielectric layer 113 may also be air which realized by supporting function of spacers or any other materials. The preferred setting shall not be construed as the limitation of the present disclosure.

Further description will be given below to the case that the entirety formed by the collimated light sources 120 is configured to emit the collimated light in at least two different directions.

Figure 8:
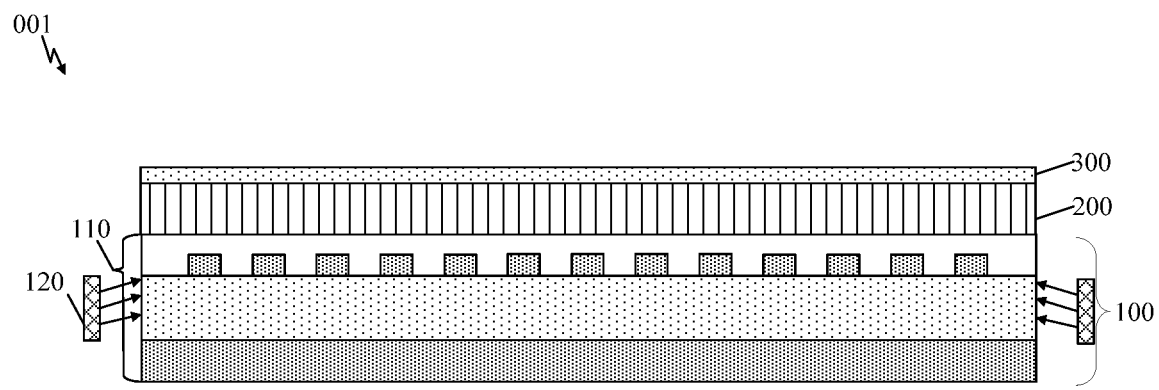
FIG. 8 is a schematic structural view of an optical field 3D display device provided by the embodiment of the present disclosure.

For example, as illustrated in FIG. 8, the backlight module 100 includes a plurality of collimated light sources 120 each of which has a single light-emitting direction; at least two of the collimated light sources 120 have different light-emitting directions; and light of at least two directions emitted by the collimated light sources 120 runs through the grating structure 112 under the coupling effect of the grating waveguide coupling structure 110, and the light-emitting direction of the emergent light is controlled, so that the backlight module 100 can emit collimated light in at least two different directions.

Figure 9:
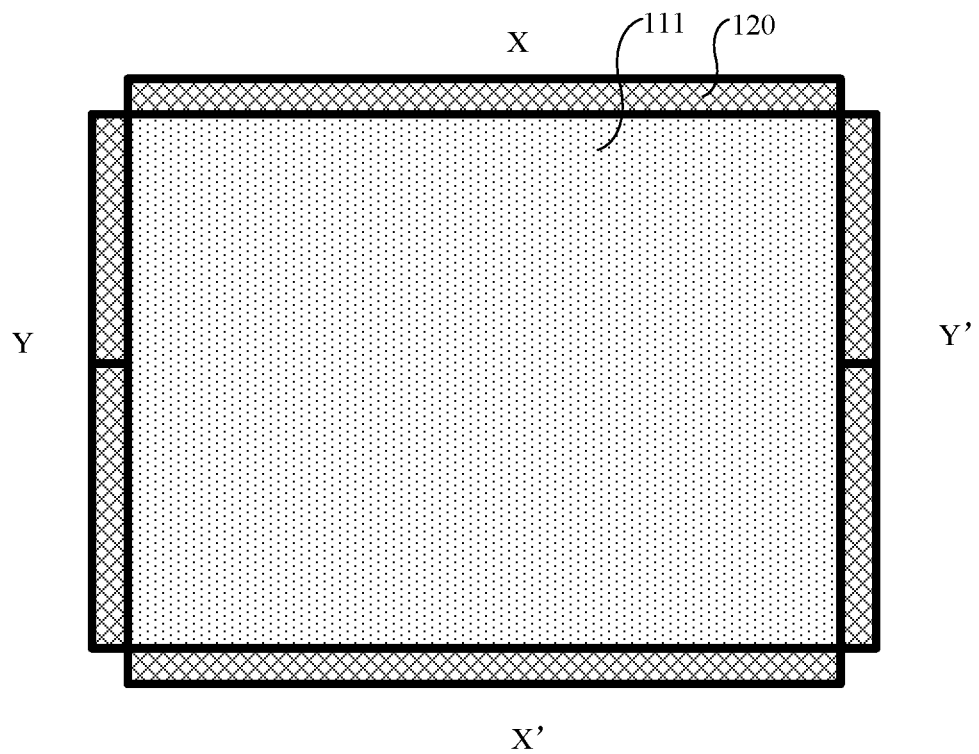
FIG. 9 is a schematic structural view of an optical field 3D display device provided by the embodiment of the present disclosure.

Moreover, as illustrated in FIG. 9, when the waveguide layer 111 is rectangular, the rectangular waveguide layer 111 has two groups of opposite sides X-X' and Y-Y', and the collimated light sources 120 each of which has a single light-emitting direction in the backlight module 100 are distributed on two opposite side surfaces of at least one group of the rectangular waveguide layer 111.

It should be noted here that the case that the collimated light sources 120 each of which has a single light-emitting direction in the backlight module 100 are distributed on two opposite side surfaces of at least one group of the rectangular waveguide layer 111 refers to that the collimated light sources 120 with single light-emitting directions may be respectively disposed on side surfaces of any group of opposite sides X-X' and Y-Y' of the rectangular waveguide layer 111. Thus, the collimated light sources 120 with single light-emitting directions disposed on the side surfaces of this group of opposite sides can emit light in two directions; after the light runs through the grating waveguide coupling structure 110, the backlight module 100 emits collimated light in two directions; the display module 200 and the light directing component 300 are adopted to converge the collimated light to two preset viewpoints; and the two preset viewpoints form a viewpoint group M belonging to the same eyeball, so as to view images with 3D effect via one eye.

Of course, the collimated light sources 120 with single light-emitting directions may also be simultaneously disposed in both of the two groups of opposite sides X-X' and Y-Y' of the rectangular waveguide layer 111, so that the collimated light sources 120 with single light-emitting direction disposed on the two groups of opposite sides can emit light in four directions. In this case, the grating structure 112 in the grating waveguide coupling structure 110 can be set to be a reticulated 2D grating structure. Thus, after the light in four directions runs through the grating waveguide coupling structure 110, the backlight module 100 can emit collimated light in four directions, and the display module 200 and the light directing component 300 are adopted to converge the collimated light to four preset viewpoints. Every two of the four preset viewpoints may be set to be respectively converged to two viewpoint groups M at the position of two eyeballs, so as to view images with 3D effect via two eyes.

It should be noted that the case that the collimated light sources 120 with single light-emitting directions are disposed on the opposite sides X-X' and/or Y-Y' of the rectangular waveguide layer 111 is only the preferred proposal of the present disclosure. Of course, the collimated light sources 120 with single light-emitting direction may be also disposed on side surfaces X-Y, X-Y', X'-Y' or X'-Y of the rectangular waveguide layer 111 according to actual demands. No limitation will be given here in the present disclosure.

In addition, the number of the collimated light sources 120 distributed on the side surfaces of the waveguide layer 111 is not limited in the present disclosure. For example, one collimated light source 120 may be respectively disposed on side surfaces X and X' in FIG. 9, or two collimated light sources 120 may be respectively disposed on side surfaces Y and Y' in FIG. 9, as long as the collimated light source 120 on a single side surface can be guaranteed to cover the entire waveguide layer 111.

Figure 10:
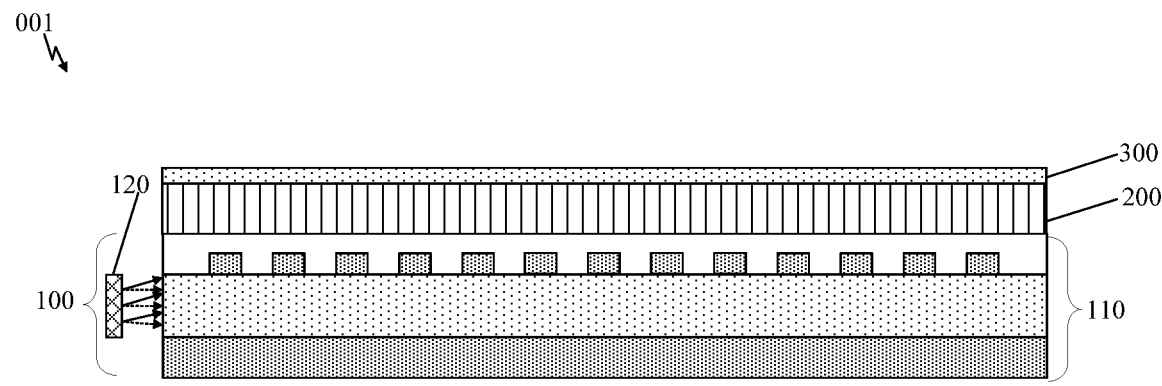
FIG. 10 is a schematic structural view of another optical field 3D display device provided by the embodiment of the present disclosure.

Moreover, for example, as illustrated in FIG. 10, the backlight module 100 includes collimated light sources 120 in at least two light-emitting directions; the collimated light sources 120 directly emit collimated light in at least two light-emitting directions; the collimated light runs through the grating structure 112 under the coupling effect of the grating waveguide coupling structure 110; and the light-emitting direction of emergent light is controlled, so that the backlight module 100 can emit collimated light in at least two different directions.

On this basis, when the waveguide layer 111 is rectangular, the case that the backlight module 100 includes the collimated light sources 120 in at least two light-emitting directions may be as illustrated in FIG. 10: the collimated light sources 120 in at least two light-emitting directions may be distributed on one side surface of the waveguide layer, so that the backlight module 100 can emit collimated light in two directions, and the display module 200 and the light directing component 300 are adopted to converge the collimated light to two preset viewpoints in one viewpoint group M, so as to view images with 3D effect via one eye; or the collimated light sources 120 in at least two light-emitting directions may also be distributed on two side surfaces of the waveguide layer, so that the backlight module 100 can emit collimated light in four directions, and the display module 200 and the light directing component 300 are adopted to converge the collimated light to four preset viewpoints in two viewpoint groups M, so as to view images with 3D effect via two eyes.

In addition, the collimated light sources 120 may be formed by red, green and blue semiconductor laser chips, may also be formed by the collimation and beam expanding of red, green and blue light-emitting diode (LED) chips, may also be formed by the collimation and beam expanding of white LED chips, or formed by strip cold cathode fluorescent lamps (CCFLs) and some light collimating structures. No limitation will be given here in the present disclosure.

Figure 11:
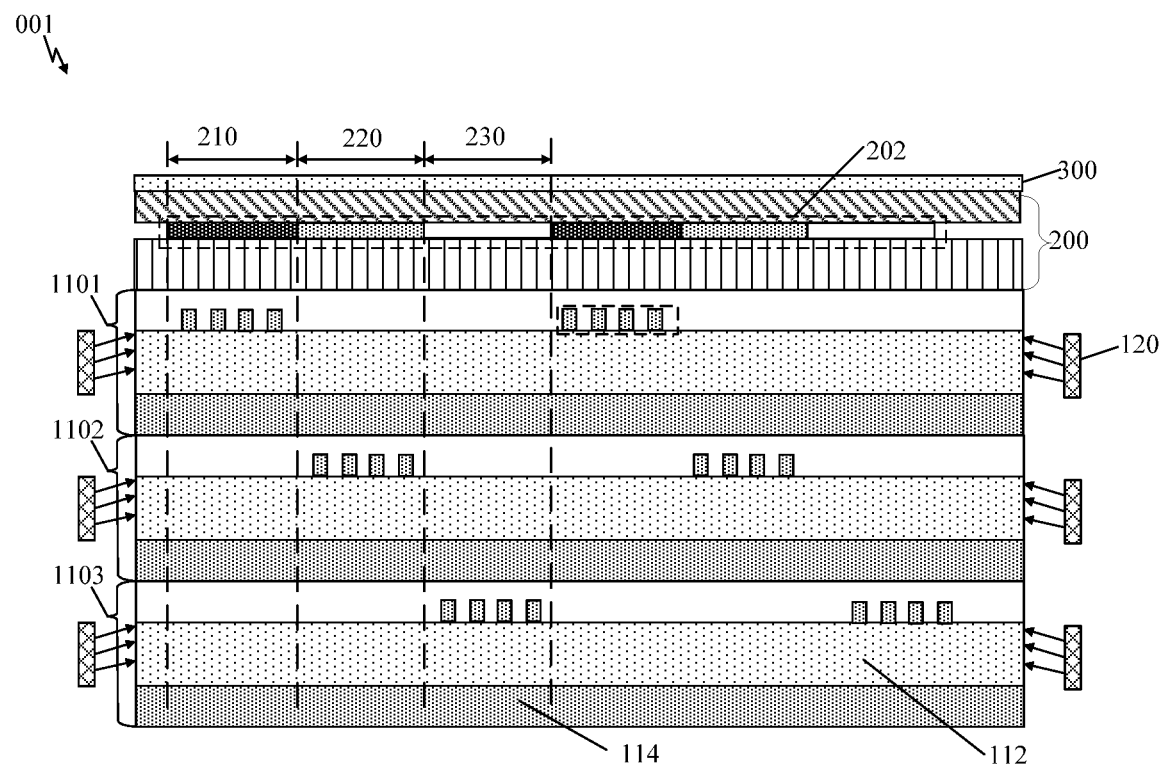
FIG. 11 is a schematic structural view of another optical field 3D display device provided by the embodiment of the present disclosure.

On this basis, the display module 200 includes a first subpixel unit 210, a second subpixel unit 220 and a third subpixel unit 230. As illustrated in FIG. 11, the backlight module 100 includes a first grating waveguide coupling structure 1101, a second grating waveguide coupling structure 1102 and a third grating waveguide coupling structure 1103 which are stacked each other. A grating structure 112 of the first grating waveguide coupling structure 1101 is arranged opposite to the first subpixel unit 210; a grating structure 112 of the second grating waveguide coupling structure 1102 is arranged opposite to the second subpixel unit 220; and a grating structure 112 of the third grating waveguide coupling structure 1103 is arranged opposite to the third subpixel unit 230.

Collimated light sources 120 disposed on side surfaces of the first grating waveguide coupling structure 1101, collimated light sources 120 disposed on side surfaces of the second grating waveguide coupling structure 1102, and collimated light sources 120 disposed on side surfaces of the third grating waveguide coupling structure 1103 are configured to emit light of different primary colors which may be respectively red light, blue light and green light. No limitation will be given here in the present disclosure.

Figure 12:
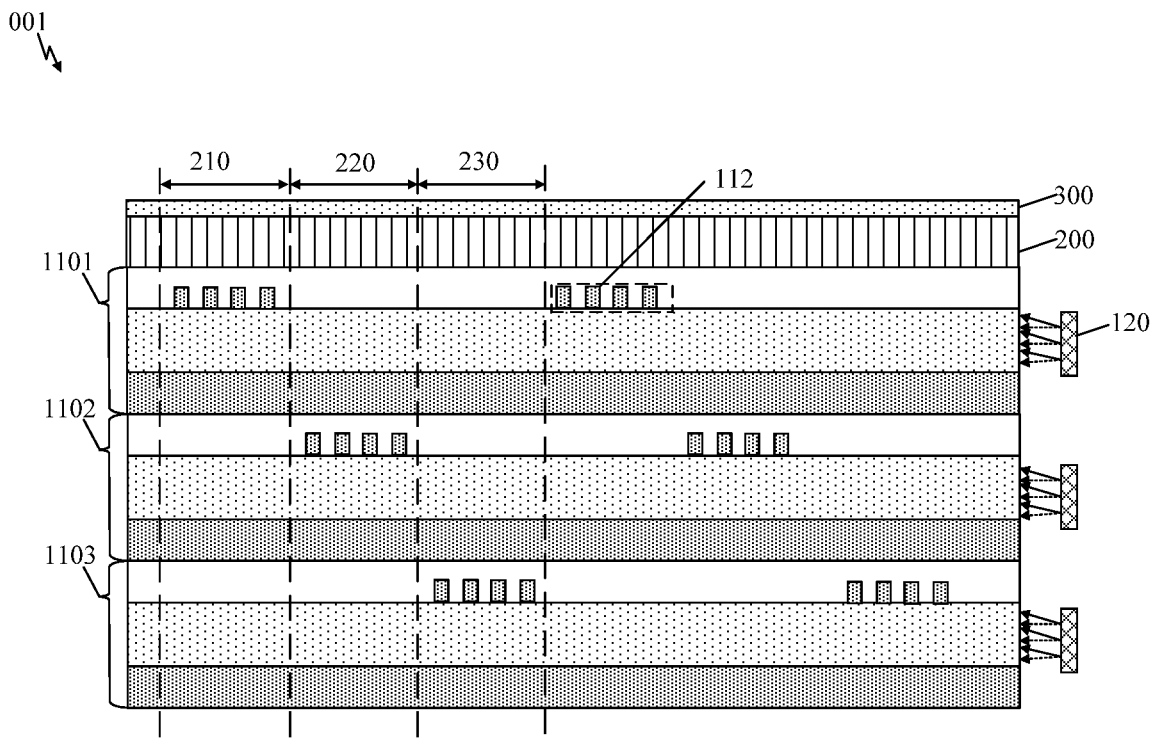
FIG. 12 is a schematic structural view of another optical field 3D display device provided by the embodiment of the present disclosure.

In addition, the collimated light sources 120 disposed on the first grating waveguide coupling structure 1101, the second grating waveguide coupling structure 1102 and the third grating waveguide coupling structure 1103 may be as illustrated in FIG. 11: the collimated light sources 120 are collimated light sources with single light-emitting directions distributed on side surfaces of one group or multiple groups of opposite sides of the waveguide layer 111 (description is given in FIG. 11 by only taking side surfaces of one group of opposite sides as an example); and may also be as illustrated in FIG. 12: the collimated light sources 120 are collimated light sources in at least two directions distributed on a side surface of the waveguide layer 111 (description is given in FIG. 12 by taking one side surface as an example).

It should be noted here that: as illustrated in FIGS. 11 and 12, as the first grating waveguide coupling structure 1101, the second grating waveguide coupling structure 1102 and the third grating waveguide coupling structure 1103 adopt light of different primary colors, the backlight module 100 can directly emit light of different colors at positions corresponding to the first subpixel unit 210, the second subpixel unit 220 and the third subpixel unit 230. In this case, as illustrated in FIG. 12, the display device 001 can achieve image display of different colors without the color filter layer 202. Of course, in actual application, in order to effectively avoid the crosstalk between the light of different colors, as illustrated in FIG. 11, the display device 001 includes the color filter layer 202, so as to ensure the color contrast and saturation of displayed images.

It should be also noted here that: as illustrated in FIG. 8 or 11, as for two groups of collimated light sources 120 with single light-emitting directions which are oppositely arranged on the side surfaces of one group of opposite sides of the waveguide layer 111 in the grating waveguide coupling structure 110, the light-emitting direction of the collimated light sources 120 with single light-emitting directions may be parallel to the waveguide layer 111 and may also form a specific included angle with the plane provided with the waveguide layer 111 as illustrated in FIG. 6. For example, when the waveguide layer 111 is thick, the light-emitting direction of the collimated light sources 120 may form a specific angle with the waveguide layer 111, so as to ensure that the light can have high luminous efficiency in the case of total reflection in the waveguide layer 111; and when the waveguide layer 111 is thin enough, for example, the light-emitting direction of the collimated light sources 120 is parallel to the waveguide layer 111, so that the light can be coupled into the waveguide layer 111 to a maximum extent, and then the light utilization rate can be improved. As illustrated in FIG. 10 or 12, as for the collimated light sources 120 in at least two light-emitting directions disposed in the waveguide layer 111 of the grating waveguide coupling structure 110, the at least two light-emitting directions of the collimated light sources 120 in at least two light-emitting directions may be deviated along the perpendicular line direction of the plane provided with the waveguide layer 111.

On this basis, as for the first grating waveguide coupling structure 1101, the second grating waveguide coupling structure 1102 and the third grating waveguide coupling structure 1103 which are stacked with each other, when the thickness of the lower dielectric layer 114 disposed beneath the waveguide layer 111 is less than 10 μm, the dielectric layer between adjacent waveguide layers 111 is too thin, which is easy to cause crosstalk phenomenon of light of different colors between different waveguide layers 111; and when the thickness of the transparent lower dielectric layer 114 disposed beneath the waveguide layer 111 is greater than 100 μm, the thickness of the backlight module 100 is too large, which is unfavorable to the light and thin design of the display device. Thus, the thickness of the lower dielectric layer 114 of the waveguide layer 111 is preferably 10 μm-100 μm in the present disclosure. Of course, as for the lower dielectric layer 114 disposed at the bottom, for example, as a lower dielectric layer 114 of the third grating waveguide coupling structure 1103 in FIG. 11 is disposed at the bottom of the backlight module 100, and the light is not required to be incident from the lower part of the lower dielectric layer 114, the lower dielectric layer 114 may be a metal reflective film layer.

Second Embodiment

As illustrated in FIG. 3C, the backlight module 100 may also be a direct-lit backlight module. The direct-lit backlight module can emit collimated light in at least two different directions (description is given in FIG. 3C by only taking collimated light in two different directions as an example), so that the backlight module 100 can achieve the objective of emitting collimated light in at least two different directions.

Figure 13:
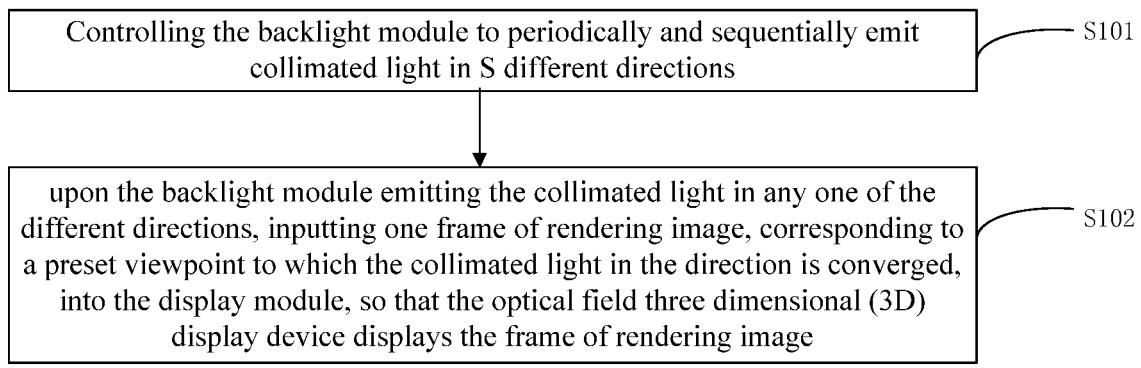
FIG. 13 is a flow diagram of an image display method for another optical field 3D display device provided by the embodiment of the present disclosure.

The embodiment of the present disclosure further provides an image display method applied to any foregoing display device 001. As illustrated in FIG. 13, the image display method comprises the following steps.

S101: controlling the backlight module to periodically and sequentially emit collimated light in S different directions; and S102: upon the backlight module emitting collimated light in any one of the different directions, inputting one frame of rendering image, corresponding to the preset viewpoint to which the collimated light in the direction is converged, into the display module, so that the optical field 3D display device can display this frame of rendering image.

Further description will be given below to the acquisition method of the above rendering image.

Figure 14:
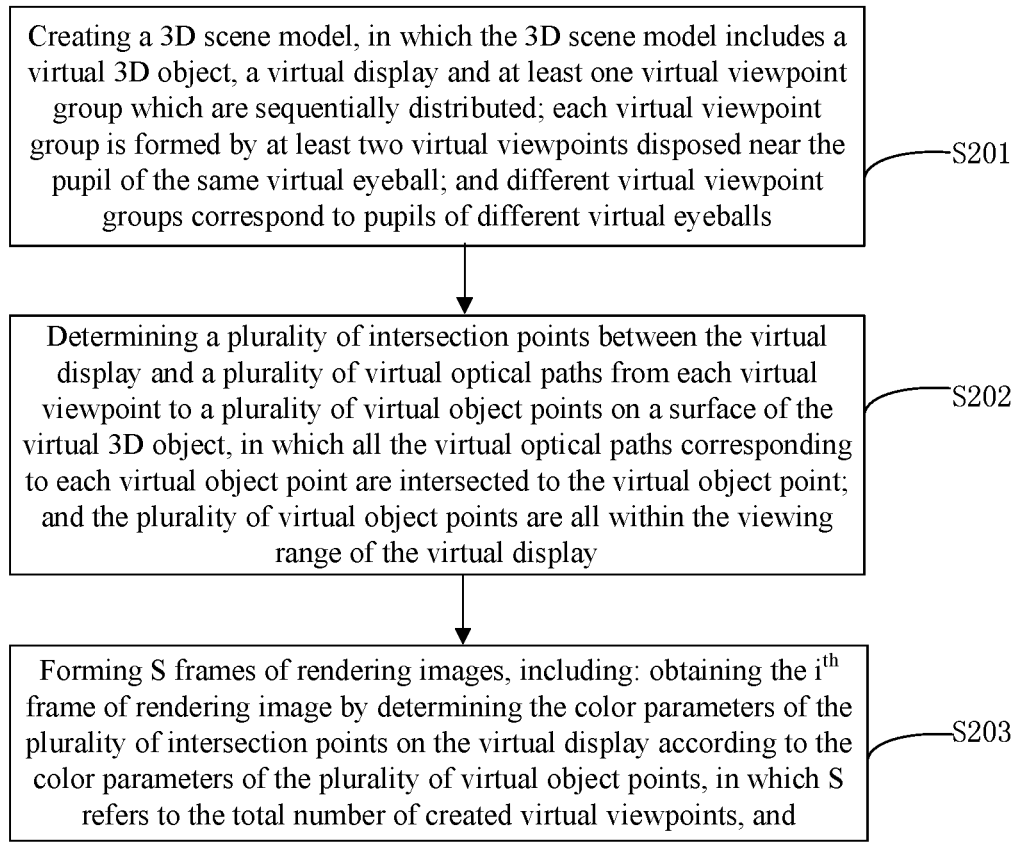
FIG. 14 is a flow diagram of a rendering method of a 3D object, provided by the embodiment of the present disclosure.

For example, a rendering image of a 3D object may be acquired by adoption of a computer to simulate the 3D object. For example, as illustrated in FIG. 14, the process includes the following steps.

Figure 15:
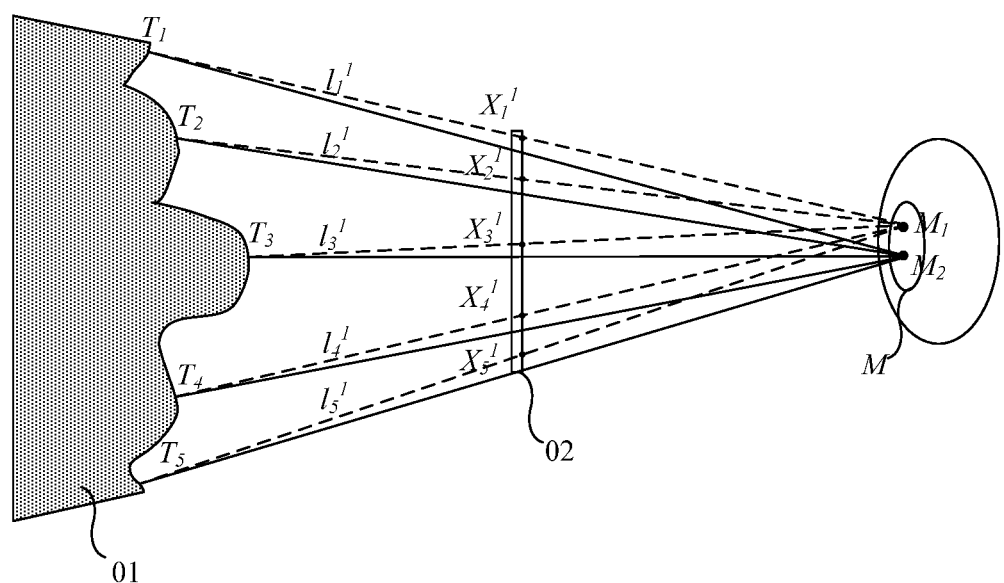
FIG. 15 is a schematic structural view illustrating optical paths of the rendering method of the 3D object, provided by the embodiment of the present disclosure.

S201: creating a 3D scene model. As illustrated in FIG. 15, the 3D scene model includes a virtual 3D object 01, a virtual display 02 and at least one virtual viewpoint group M which are sequentially distributed. Each virtual viewpoint group M is formed by at least two virtual viewpoints disposed on the same virtual pupil. Different virtual viewpoint groups correspond to different virtual pupils.

S202: determining a plurality of intersection points between $\{X_1^i, X_2^i, \ldots, X_n^i\}$ between the virtual display 02 and a plurality of virtual optical paths $\{l_1^i, l_2^i, \ldots, l_n^i\}$ from each virtual viewpoint $M_i$ to a plurality of virtual object points $\{T_1, T_2, \ldots, T_n\}$ on a surface of the virtual 3D object 01. All the virtual optical paths $\{l_k^1, l_k^2, \ldots, l_k^i\}$ corresponding to the virtual object point $T_k$ are intersected to the virtual object point $T_k$, in which ($1 \leq k \leq n$,) $1 \leq i \leq S$, and S refers to the total number of created virtual viewpoints. The plurality of virtual object points $\{T_1, T_2, \ldots, T_n\}$ are all within the viewing range of the virtual display 02.

For example, the step S202 may take the case that within the viewing angle of the virtual display 02, a viewpoint $M_1$ is taken as an emission viewpoint and a viewpoint $M_2$ is taken as a backtracking viewpoint as an example. Firstly, a plurality of first light, being emitted by the emission viewpoint $M_1$, running through the virtual display 02 and arriving at the surface of the virtual 3D object, is simulated; first intersection points $\{X_1^1, X_2^1, \ldots, X_n^1\}$ between the plurality of first light and the virtual display 02 are acquired; and the intersection points between the first light and the surface of the virtual 3D object are virtual object points $\{T_1, T_2, \ldots, T_n\}$. Secondly, second light emitted by the plurality of virtual object points $\{T_1, T_2, \ldots, T_n\}$ to the backtracking viewpoint $M_2$ is simulated, and second intersection points $\{X_1^2, X_2^2, \ldots, X_n^2\}$ between the plurality of second light and the virtual display 02 are acquired. Thus, optical paths from the emission viewpoint to the virtual object point and optical paths from the backtracking viewpoint to the virtual object point can be accurately intersected to the virtual object point by emitting light from the emission viewpoint to the virtual object point first and then emitting light from the virtual object point to the backtracking viewpoint, so the acquired rendering image can be more real.

S203: forming S frames of rendering images, including: obtaining the $i^{th}$ frame of rendering image by determining the color parameters of the plurality of intersection points $\{X_1^i, X_2^i, \ldots, X_n^i\}$ on the virtual display 02 according to the color parameters of the plurality of virtual object points $\{T_1, T_2, \ldots, T_n\}$.

Figure 16:
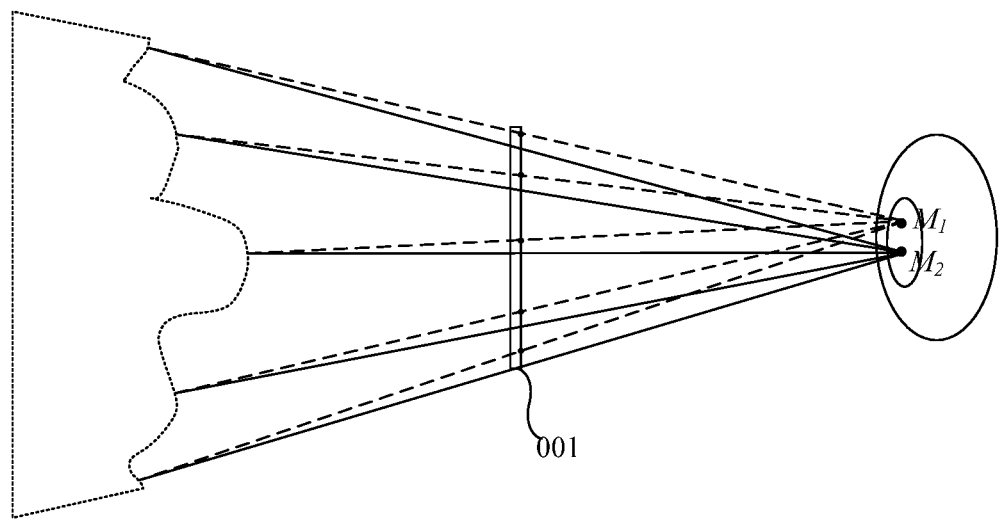
FIG. 16 is a schematic diagram illustrating optical paths of monocular imaging in the optical field 3D display device provided by the embodiment of the present disclosure.
Figure 17:
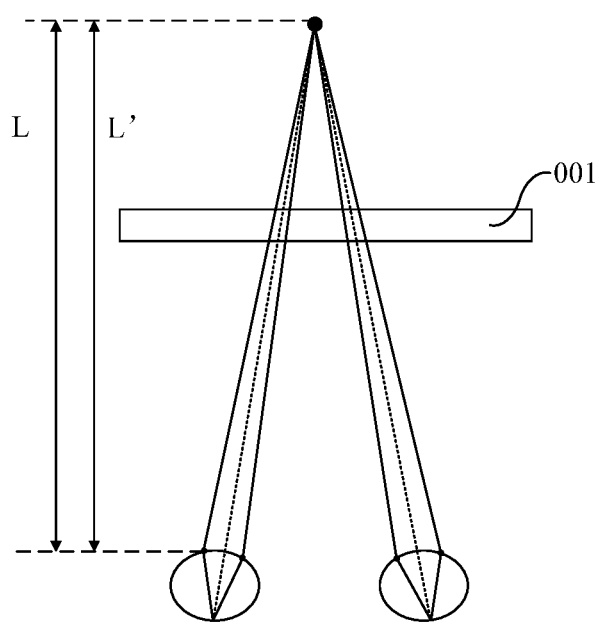
FIG. 17 is a schematic diagram illustrating optical paths of binocular imaging in the optical field 3D display device provided by the embodiment of the present disclosure.

When the display device 001 displays the rendering image acquired by the above method, as illustrated in FIG. 16, the image with 3D effect may be acquired via one eye, or as illustrated in FIG. 17, the image with 3D effect may also be acquired via two eyes. Description is given in FIG. 17 by taking the case of acquiring one point in the image with 3D effect via two eyes as an example. The detailed optical paths may refer to FIG. 16. No further description will be given here. In this case, when the image with 3D effect is acquired via two eyes, the focal distance L' of the image acquired by the viewpoint group of one eye can be consistent with the vision convergence distance L when the two eyes acquire the image with 3D effect respectively through the viewpoint groups in corresponding eyeballs. Therefore, the dizzy problem in the parallax 3D technology can be solved.

Of course, the foregoing is only an example of the rendering method of the rendering image applied to the display device 001. The rendering image applied to the display device 001 provided by the embodiment of the present disclosure may be also obtained by other rendering methods. No limitation will be given here in the embodiment of the present disclosure.

The foregoing is only the preferred embodiments of the present disclosure and not intended to limit the scope of protection of the present disclosure. The scope of protection of the present disclosure should be defined by the appended claims.

The invention claimed is:

1. A display device, comprising a backlight module, a display module and a light directing component which are sequentially arranged, wherein
the backlight module is configured to periodically and sequentially emit collimated light in S different directions; the collimated light in different directions runs through the display module and arrives at the light directing component, in which S≥2; and
the light directing component is configured to converge incident collimated light in a same direction to a same preset viewpoint and converge incident collimated light in different directions to different preset viewpoints, in which the preset viewpoints at least include two preset viewpoints belonging to a same eyeball,
wherein the two preset viewpoints belonging to the same eyeball display two separate images and the two separate images have same content,
wherein the backlight module includes a grating waveguide coupling structure; the grating waveguide coupling structure includes a waveguide layer, a grating structure disposed on an upper surface of the waveguide layer, an upper dielectric layer disposed above the waveguide layer, and a lower dielectric layer disposed beneath the waveguide layer; the upper dielectric layer and the lower dielectric layer have a refractive index less than that of the waveguide layer.

2. The display device according to claim 1, wherein the preset viewpoints include a plurality of preset viewpoints belonging to different eyeballs; the preset viewpoints belonging to the same eyeball form one viewpoint group; and the preset viewpoints belonging to different eyeballs form different viewpoint groups.

3. The display device according to claim 1, wherein a maximum angle between the collimated light in different directions corresponding to different viewpoints belonging to the same eyeball is less than or equal to 1°.

4. The display device according to claim 1 wherein the backlight module includes a plurality of collimated light sources each of which has a single light-emitting direction; and at least two collimated light sources in the plurality of collimated light sources have different light-emitting directions.

5. The display device according to claim 4, wherein the waveguide layer has a planar shape of rectangular; and the collimated light sources with single light-emitting directions in the backlight module are distributed on two opposite side surfaces of the waveguide layer.

6. The display device according to claim 1, wherein the collimated light sources have at least two light-emitting directions.

7. The display device according to claim 6, wherein the waveguide layer has a planar shape of rectangular; and the collimated light sources with at least two light-emitting directions in the backlight module are distributed on one side surface of the waveguide layer.

8. The display device according to claim 1, wherein the upper dielectric layer is optical adhesive and the lower dielectric layer is transparent organic material.

9. The display device according to claim 1, wherein the display module includes a first subpixel unit, a second subpixel unit and a third subpixel unit; the backlight module includes a first grating waveguide coupling structure, a second grating waveguide coupling structure and a third grating waveguide coupling structure; a grating structure of the first grating waveguide coupling structure is arranged opposite to the first subpixel unit; a grating structure of the second grating waveguide coupling structure is arranged opposite to the second subpixel unit; a grating structure of the third grating waveguide coupling structure is arranged opposite to the third subpixel unit; and the collimated light source disposed on a side surface of the first grating waveguide coupling structure, the collimated light source disposed on a side surface of the second grating waveguide coupling structure, and the collimated light source disposed on a side surface of the third grating.

10. The display device according to claim 9, wherein the lower dielectric layer has a thickness of 10 μm-100 μm.

11. The display device according to claim 1, wherein the backlight module is a direct-lit backlight module; and the direct-lit backlight module is configured to emit collimated light in at least two light-emitting directions.

12. The display device according to claim 1, wherein the light directing component is a lens, a microlens array or a transmission grating.

13. An image display method applied to the display device according to claim 1, comprising:
controlling the backlight module to periodically and sequentially emit collimated light in S different directions; and
upon the backlight module emitting the collimated light in any one of the different directions, inputting one frame of rendering image, corresponding to a preset viewpoint to which the collimated light in the direction is converged, into the display module, so that the frame of rendering image is displayed by the display module.

14. The display device according to claim 1, wherein the backlight-module further includes at least one collimated light source disposed on a side surface of the waveguide layer; and the at least one collimated light source as a whole is configured to emit collimated light in at least two different directions.

15. The image display method according to claim 13, wherein incident collimated light in a same direction is converged to a same preset viewpoint and incident collimated light in different directions is converged to different preset viewpoints, in which the preset viewpoints at least include two preset viewpoints belonging to a same eyeball.

16. The image display method according to claim 13, wherein the preset viewpoints include a plurality of preset viewpoints belonging to different eyeballs; the preset viewpoints belonging to the same eyeball form one viewpoint group; and the preset viewpoints belonging to different eyeballs form different viewpoint groups.

17. The image display method according to claim 13, wherein each viewpoint group includes at least two preset viewpoints.

18. The image display method according to claim 13, wherein a maximum angle between the collimated light in different directions corresponding to different viewpoints belonging to the same eyeball is less than or equal to 1°.

* * * * *